United States Patent [19]

Morshauser et al.

[11] 4,154,887

[45] May 15, 1979

[54] SURFACE TREATMENT OF RIGID POLYVINYL CHLORIDE

[75] Inventors: Fred S. Morshauser, Pequannock Township, Passaic County; Luther L. Roberts, North Plainfield, both of N.J.

[73] Assignee: GAF Corporation, New York, N.Y.

[21] Appl. No.: 892,145

[22] Filed: Mar. 31, 1978

[51] Int. Cl.$^2$ .......................... B05D 1/36; B05D 7/02; B32B 27/30
[52] U.S. Cl. ...................................... 428/201; 427/384; 427/402; 428/336; 428/522; 427/407 F
[58] Field of Search ................... 427/384, 402, 407 F; 428/522, 201, 336

[56] References Cited

U.S. PATENT DOCUMENTS

| | | | |
|---|---|---|---|
| 3,004,056 | 10/1961 | Nunn et al. | 252/89 X |
| 3,346,670 | 10/1967 | Papalos | 260/980 |

*Primary Examiner*—James R. Hoffman
*Attorney, Agent, or Firm*—Walter C. Kehm; Joshua J. Ward

[57] ABSTRACT

Rigid polyvinyl chloride article and method for making same. The article comprises a substrate of PVC containing metallic soap of $C_8$-$C_{22}$ fatty acid which is coated with an anionic phosphate acid ester surfactant and then a protective top coat. The surfactant improves adhesion of the top coat.

10 Claims, No Drawings

SURFACE TREATMENT OF RIGID POLYVINYL CHLORIDE

BACKGROUND OF INVENTION

Rigid polyvinyl chloride (PVC) products such as building panels, e.g. siding and roofing panels, are frequently coated with top coats designed to enhance the decorative effect of the products or to protect the products from weathering. Such PVC products frequently include in the PVC compositions minor amounts of lubricants to enable the article to be extruded or calendered to the desired shape. Unfortunately, many of the lubricant compositions commonly used, especially metallic soap of higher fatty acids, when used in amounts sufficient to impart the desired lubricating properties to the PVC composition, have a tendency to exude from the surface of the finished product. This substantially reduces the ability of most commonly used top coats to adhere to the surface of the article and causes a whitening of the surface. While solvents have been satisfactorily used in preparing the surfaces or rigid PVC substrates for application of top coats, the use of solvents is generally considered undesirable because of the cost and health hazards associated with solvent vapors. The use of solvents for this purpose also usually necessitates a delay of up to several weeks between formation of the PVC substrate and the solvent treatment to prevent further exudation of lubricant after cleaning of the substrate with solvent.

SUMMARY OF THE INVENTION

It is an object of the invention to provide an improved PVC product and method of making same.

The product of the invention is a rigid PVC product comprising:

(a). a PVC substrate containing between about 0.3 and about three pounds per hundred pounds resin (PHR) of metallic soap of $C_8$-$C_{22}$ fatty acid; and (b). a protective or decorative top coat adhered to a surface of said substrate by a layer of anionic surfactant, preferably a phosphate acid ester surfactant.

The method of the invention comprises treatment of a surface of rigid PVC substrate containing between 0.3 and 3 PHR metallic soap of $C_8$-$C_{22}$ fatty acid by coating such surface with a continuous layer of an anionic surfactant, preferably a phosphate acid ester surfactant. A top coating is perferably then applied to the surfactant coated substrate.

DETAILED DESCRIPTION OF THE INVENTION

As mentioned above, the product of the invention comprises:

(a). a PVC substrate containing between about 0.3 and about three pounds per hundred pounds resin (PHR) of metallic soap of $C_8$-$C_{22}$ fatty acid; and (b). a protective or decorative top coat adhered to a surface of said substrate by a layer of anionic surfactant whereby the surfactant layer improves adhesion of the top coat to the PVC substrate.

Products which may be made in accordance with the invention include such conventional products as PVC pipes, building panels, e.g. siding or roofing panels, etc. The invention is particularly applicable in the case of products where a decorative or protective top coating is desired, since as mentioned above the presence of metallic soap of $C_8$-$C_{22}$ fatty acids in the PVC composition in amounts sufficient to enable proper extrusion or calendering of the product tends to result in exuding of the metallic soap onto the surface of the finished product, thereby reducing ability of top coats to adhere to the surface of the PVC substrate and causing undesirable whitening of colored products.

PVC compositions suitable for use in the present invention include any of the conventional PVC materials generally considered suitable for use in the manufacture of rigid PVC products. These include for instance materials such as polyvinyl chloride itself, polyvinylidene chloride, copolymers thereof, post chlorinated polyvinyl chlorides, mixtures of polyvinyl chlorides with chlorinated polyethylenes or acrylonitriles, butadiene/styrene copolymers, etc. PVC material for use in the invention usually has a weight average molecular weight of between about 30,000 and 200,000, more usually between 70,000 and 100,000. It is generally preferred that the PVC used in the invention be at least 80 weight percent vinyl chloride polymer with from 0 to 20 weight percent of one or more of the other monomers or copolymers mentioned being present.

PVC compositions used in substrates forming a part of the product of the invention and used in the process of the invention include, as mentioned above, between 0.3 and 3 PHR metallic soap of $C_8$-$C_{22}$ fatty acid. Such metallic soaps are well known lubricants in PVC compositions and function to enable the PVC composition to be extruded or calendered in a satisfactory manner in the making of rigid PVC products such as pipes, building panels, etc. Use of amounts of such lubricants substantially in excess of about 3 PHR reduces the impact strength of the finished product while use of less than about 0.3 of such lubricants is frequently insufficient to allow the PVC composition to be properly extruded or calendered to form the desired products. In any event, use of amounts of such lubricant adequate for the purpose of allowing proper extruding or calendering provides a substrate containing sufficient metallic soap so that the soap tends to exude from the surface of the product, thereby making it difficult to adhere the top coat satisfactorily and causing whitening of colored product.

Metallic soaps of fatty acids used as lubricants in the PVC compositions of the invention preferably have as the metallic component of the soap zinc, cadmium, aluminum or magnesium although other metals normally used in PVC lubricants are satisfactory. Preferred soap components are stearates although any other soaps $C_8$-$C_{22}$ fatty acids or mixtures thereof are considered satisfactory. Suitable lubricants include for instance:

Calcium Stearate
Zinc Palmitate
Cadmium Myrstate
Aluminum Caprate
Magnesium Behenate
Strontium Carproate
Zinc Laurate
Calcium Oleate Phosphate acid ester surfactants suitable for preferred embodiments of the invention are well known. Such surfactants and their manufacture are described for instance in U.S. Pat. Nos. 3,346,670 and 3,004,056, the disclosures of which are incorporated herein by reference. Such surfactants may be prepared by esterification of nonionic surfactants with phosphating agents such as phosphorous pentoxide, phosphorous trichloride, or phosphorous oxychloride. Particularly suitable nonionic surfactants for use as starting materials are those having the molecular configuration of a condensation product of at least one mol of an alkylene oxide with one mole of a compound containing at least 6 carbon atoms and a reactive hydrogen atom. Suitable alkylene oxides include for instance propylene oxide, butylene oxide or preferably ethylene oxide. Preferred nonionic starting materials are polyoxyalkylene derivatives of alkylated and polyalkylated phenols, multi-branched chain primary aliphatic alcohols produced from a polyolefin having at least 7 carbon atoms, and straight chain aliphatic alcohols of at least 10 carbon atoms.

Surfactants used in the product and process of the invention are as mentioned above anionic in nature with phosphate acid ester type surfactants being preferred. Particularly preferred surfactants for use in the products and method of the invention are phosphate acid ester surfactants having either aliphatic hydrophobic bases or aromatic hydrophobic bases. Such surfactants are commonly available and are used for a number of industrial purposes.

The surfactant layer of products of the invention may be a thin, continuous layer of surfactant such as is formed by applying a coating of surfactant in practicing the process of the invention or may be a discontinuous layer resulting from dispersion of such a continuous layer into the top coat. Where the surfactant layer has become discontinuous, it is preferably at least about 90% continuous, i.e. cover at least about 90% of the surface of the substrate, in order to insure adequate adhesion of top coat to substrate. Surfactant layers are preferably between about 0.01 and about 1 mil thick.

Top coats used in forming products of the invention and in practicing the preferred process of the invention include any of the conventional top coats used for rigid PVC products with water emulsion coatings, especially latex or acrylic emulsions, being preferred. Suitable top coat materials include for instance such conventional coatings as polyvinyl acetate, vinyl acrylics, alkyd paints and urethanes, etc. As is conventional in manufacturing rigid PVC products, top coats, where used, are frequently used in thicknesses between about 1 and 5 mils.

In addition to ingredients discussed herein, PVC substrates treated according to the invention may also include minor amounts of other ingredients such as conventional lubricants other than those required by the invention. Such additional ingredients are preferably present in amounts not exceeding about 5 wt% of the substrate.

As mentioned above, the method of the invention involves treatment of the surface of a rigid PVC substrate containing between about 0.3 and about 3.0 PHR of metallic soap of $C_8$-$C_{22}$ fatty acid by coating such surface with a continuous layer of anionic surfactant. The thus treated surface is then preferably coated with a conventional paint or other top coat to provide decorative effect or protection from the elements. The PVC substrate used in practicing the method of the invention may comprise any of the same PVC compositions considered suitable for the product of the invention and the surfactant with which the surface of the substrate is coated in accordance with the invention may be any of the suitable surfactants discussed above in connection with the product of the invention.

In treating surfaces of rigid PVC substrate in accordance with the invention, it is essential that surfactant be applied to the surface so as to provide a continuous layer of surfactant on the surface. In order to provide a suitable treated surface for subsequent application of top coat, it is generally preferred that the surfactant be applied so as to form a uniform, dry film of surfactant between about 0.01 and about one mil thick. Thinner layers of surfactant are difficult to obtain without discontinuities in the surfactant layer. Substantially thicker layers of surfactant may be functional but are uneconomical due to the high cost of surfactant.

In order to obtain the desirable, relatively thick continuous coats of surfactant required by the invention, the surfactant is normally applied in the form of colloidal dispersion or solution in water. As will be apparent from a consideration of the above description of suitable surfactants, some will be solids and some in liquid form, but usually the surfactants will be too viscous to be applied without dispersion or solution in solvent or water. Since one of the prime objectives of the invention is to eliminate the need for using solvents in treating surfaces or rigid PVC substrates, water dispersions or solutions of surfactants are normally employed in practicing the invention. Colloidal dispersions of suitable surfactants are especially preferred. In the context of the invention, the term "dispersion" is intended to include what strictly speaking might be considered emulsions, i.e. the term "dispersion" is intended to include either solid or liquid particles of surfactant dispersed in water. As mentioned colloidal dispersions are usually necessary to obtain the desired thickness of the resulting coating of surfactant on PVC substrate. The preferred colloidal dispersions of surfactant in water used in the invention are frequently used in concentrations of between about 0.05 to about 1.5 wt% of surfactant in aqeuous solution.

Surfactant coatings applied in accordance with the process of the invention are generally applied in thicknesses between about ¼ and about 2 mils. In this respect it is essential to obtain a continuous coating of surfactant over the PVC substrate. On the other hand, if the wet surfactant coating is too thick, i.e., substantially in excess of 2 mils, there is a tendency for "fish eyes" to form during coating and drying of the surfactant so that the dry surfactant layer is not in fact continuous. Wet surfactant coats less than about one-fourth mil thick tend to be discontinuous and frequently do not provide sufficient surfactant to fill in irregularities in the surface of the PVC substrate.

While surfactant may be applied to PVC substrate in any suitable manner, the use of a hydraulic pressure spray with a high degree of atomization is preferred as a means of forming the relatively uniform continuous thin coating of surfactant desired. Hydraulic pressure spray application with a high degree of atomization is a well known coating technique.

High pressure spray apparatus used in applying surfactant in accordance with the invention may be of any suitable type, preferably the type in which mechanical break-up nozzles are used to obtain the desired degree of atomization.

Surfactant applied as described above may be dried in any suitable manner such as by exposure to air or in an oven, etc. to form the surfactant layer of the invention.

Application of surfactant with air atomization tends to give non-homogeneous, discontinuous coatings where the preferred wet coatings of between about one-fourth mil and about 2 mil thickness are applied. Techniques such as dipping, low-pressure spraying with low atomization, etc. have a tendency to give thicker coats with larger beads of surfactant resulting in a non-uniform coating which tends to be discontinuous unless excessive amounts of surfactant are used. It should be understood, however, that while hydraulic pressure spraying with a high degree of atomization is preferred, any application technique which will result in the essential continuous coating of surfactant and especially in the preferred thin layer of surfactant described above is considered to be within the scope of the invention.

Following the treatment with surfactant in accordance with the invention, the substrate is preferably further treated by coating with a conventional paint or other top coat as mentioned above. The application of such additional paint or top coat is conventional and any of the normally used top coat materials may be applied using any conventional means of application.

The following example illustrates various possible embodiments of the invention but is not intended to limit the scope of the invention.

EXAMPLE

For evaluation of the invention, a number of samples of PVC siding panels were produced, surface treated by various means and then coated with various top coats, all as described below. The siding panels used in making these evaluations were sections of commercial siding extruded from PVC molding composition having the following ingredients.

| Ingredient | Lbs/100/Lbs Resin (PHR) |
|---|---|
| Goodyear BK-75-Dispersion Resin | |
| Cin. Mildcron TM-181 Stabilizer | 1.6 |
| Rohm & Haas KM323B - Processing Aid | 7.0 |
| Rohm & Haas K-120N - Impact Modifier | 1.6 |
| Witco Calcium Stearate | 2.5 |
| American Hoechst XL165S - Wax Lub | 1.0 |
| N.J. Zinc RF-2 - TiO$_2$ | 14.0 |
| Pluess-Staufer Omaylite 90%-Coated CaCO$_3$ | 6.0 |

Samples of the above vinyl siding were treated 5 days after extrusion by three different methods to prepare the surface for receiving top coats. One group of samples was treated by wiping the surfaces to be painted or otherwise top coated with one of three solvents; i.e. methyl ethyl ketone, isophrone or isopropyl alcohol.

Another group of samples was treated with a plasma arc unit. The third group of samples was treated with one of two phosphate ester surfactants; i.e. GAFAC RO 660 neutral and GAFAC RS 710, both commercial surfactants available from GAF Corporation. GAFAC RO 660 is the phosphate acid ester of oleyl alcohol condensed with 10 mols of ethylene oxide. GAFAC RS 710 is the phosphate acid ester of oxo tridecyl alcohol condensed with 7 mols of ethylene oxide.

In these tests the surfactants were applied to the surfaces of the siding samples by spraying a one percent aqeuous solution of surfactant onto the siding samples with a Nordson model 25 airless pump, Devilbis WV type/gun and spraying system and Tip Tee Jet 8000017. This equipment sprayed the surfactant with a high degree of atomization. Surfactant was sprayed on to a wet thickness of 1 mil and dried to a dried thickness of 0.01 mil.

Following the various surface treatments described immediately above, the siding samples were dried and then tested for wettability by the following procedure:

1. 10 ML burette stand and holder is arranged so that the burette is suspended over the base of the stand.
2. 6"×2½" samples are gently wiped with a lint free damp cloth, dried and placed on the base of the stand under the burette.
3. The burette is adjusted vertically so that the outlet tip is (1") one inch above the sample.
4. The burette is filled with distilled water.
5. Five single drops of water, the same size, are dropped on the sample at ½" intervals.
6. Let set for 3 minutes to reach equilibrum.
7. A Nickolas illuminator nozzle is placed 5 inches from the center of the drop and approximately 1¼" up from the bottom of the base so that the beam of light strikes the drop of water casting a shadow of the drop on the side away from the illuminator.
8. The shadow length is measured and recorded.
9. The shadow length is reported. The shortest shadow indicates the more wettable surface.

Results of the wettability tests are given in Table I below. In Table I wettability is indicated as millimeters with the lowest numbers representing the most wettable surfaces. The data presented in Table I, as well as the additional data present in Table II below, represents averages of results for all samples tested.

TABLE I

| WETTABILITY OF TREATED PVC SURFACES | |
|---|---|
| TREATMENT | WETTABILITY |
| Untreated | 31 mm |
| Isopropyl alcohol | 25 mm |
| Isophrone | 25 mm |
| MEK | 24 mm |
| RO 660 Neutral | 16.5 mm |
| RS 710 | 15.5 mm |
| Plasma Arc | 14.5 mm |

From Table I it can be seen that the siding samples treated with anionic surfactants were superior in wettability characteristics to the samples treated by any of the other methods except that the samples treated by plastic arc equipment were slightly more wettable. Samples treated in accordance with the invention were far superior to samples treated by solvents in accordance with normal commercial practice.

The various samples treated as described above were then coated with various top coats as described below to evaluate the adhesion of such top coats to the different samples. Samples of siding treated by each of the methods mentioned above were coated 1 mil thick top coats of the top coat materials identified in Table II below. All coatings were applied in the same manner as the surfactant.

The various samples coated as described immediately above were subjected to testing for adhesion of the top coat and given a cross-hatch adhesion reading in accordance with ASTM D5.3.6.6. On this rating scale a rating of 1 is considered excellent with no faiiures and a rating of 5 is a complete failure of adhesion. Cross-hatch adhesion ratings of the various samples are reported below in Table II.

TABLE II

| PAINTABILITY OF PVC SAMPLES | | |
|---|---|---|
| Top Coat | Surface Treatment | Cross Hatch Adhesion Rating |
| Urethane | MEK | 5 |

TABLE II-continued

PAINTABILITY OF PVC SAMPLES

| Top Coat | Surface Treatment | Cross Hatch Adhesion Rating |
|---|---|---|
|  | Isophorone | 5 |
|  | Isopropyl Alcohol | 5 |
|  | RO 660 Neutral | 2 |
|  | RS 710 | 3 |
| Vinyl Acrylic | MEK | 3 |
|  | Isophorone | 4 |
|  | Isopropyl Alcohol | 3 |
|  | RO 660 Neutral | 1 |
|  | RS 710 | 2 |
| Kynar Acrylic | MEK | 2 |
|  | Isophorone | 3 |
|  | Isopropyl Alcohol | 2 |
|  | RO 660 Neutral | 1 |
|  | RS 710 | 1 |
| AC73 Emulsion Acrylic | MEK | 3 |
|  | Isophorone | 3 |
|  | Isopropyl Alcohol | 2 |
|  | RO 660 Neutral | 1 |
|  | RS 710 | 1 |
| Methylmethacrylate | RO 660 Neutral | 1 |
|  | RS 710 | 1.5 |
| Ethylacrylate | RO 660 Neutral | 1 |
|  | RS 710 | 1 |

From Table II it can be seen that the samples coated with surfactant in accordance with the invention provided at least as good adhesion and, in most cases, superior adhesion as compared with the samples teated in a more conventional manner by wiping the various solvents.

From the data presented in the above example, it is apparent that treatment with surfactant material in accordance with the invention produces unexpectedly superior results in terms of wettability and ability of treated surfaces to adhere to various top coatings. This allows satisfactory painting or other top coating of rigid PVC materials such as building panels at the factory without the risks to health and fire hazards associated with the conventional use of solvents and eliminates the need for long periods of storage between extrusion and top coating.

While the invention has been described above with respect to preferred embodiments thereof, it will be understood that various changes may be made without departing from the spirit or scope of the invention.

What is claimed is:

1. Method for treating the surface of a rigid polyvinyl chloride substrate containing between 0.3 and 3.0 pounds per hundred pounds resin of metallic soap $C_8$-$C_{22}$ fatty acid, which method comprises coating said surface with a continuous layer of phosphate acid ester surfactant.

2. Method according to claim 1 wherein the continuous coating is between about 0.01 mil and about 1 mil thick.

3. Method according to claim 2 wherein the metallic soap is calcium stearate.

4. Method according to claim 3 wherein the layer of surfactant is applied to the substrate as an aqeuous dispersion in a layer between about 0.25 mil and about 2 mils thick and then dried to a thickness of between about 0.01 and about 1 mil.

5. Method according to claim 4 wherein the surfactant layer is then coated with a protective top coat.

6. Method for providing a protective coating on the surface of a rigid polyvinyl chloride substrate wherein the substrate contains between 0.3 and 3 pounds per hundred pounds resin of metallic coap of a $C_8$-$C_{22}$ fatty acid, which method comprises the steps of:
   (a). coating the surface of the substrate with a continuous layer of phosphate acid ester surfactant; and
   (b). then coating the substrate with a protective top coat.

7. Method according to claim 6 wherein the layer of surfactant is between about 0.01 and about 1 mil thick.

8. A rigid polyvinyl chloride article comprising:
   (a). a substrate of polyvinyl chloride containing between 0.3 and 3 pounds per hundred pounds resin metallic soap of $C_8$-$C_{22}$ fatty acid; and
   (b). a protective or decorative top coat adhered to a surface of said substrate by a layer of phosphate acid ester surfactant.

9. A rigid article according to claim 8 wherein the layer of surfactant is at least about 90% continuous and the layer of surfactant is between about 0.01 and about 1 mil thick.

10. A rigid article according to claim 9 wherein the metallic soap is calcium stearate.

* * * * *